No. 627,196. Patented June 20, 1899.
L. E. KIRSTEIN.
EYEGLASSES.
(Application filed Dec. 27, 1898.)
(No Model.)
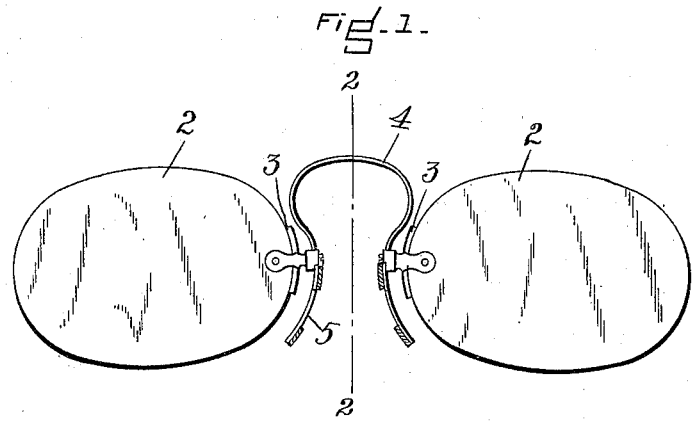
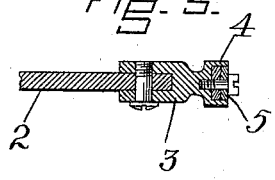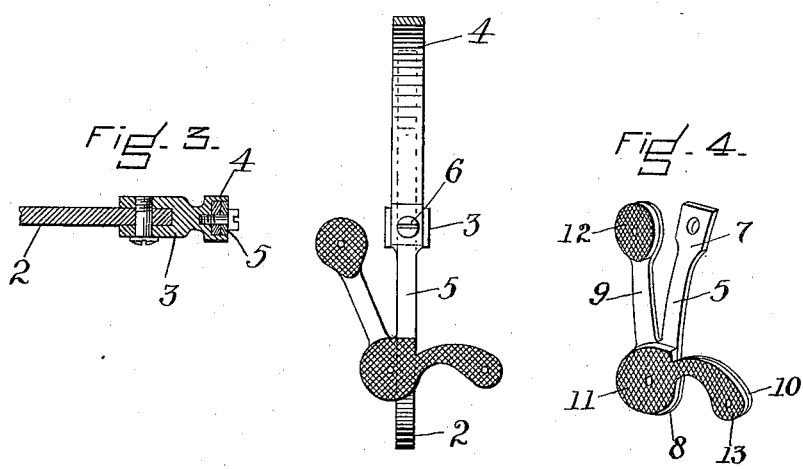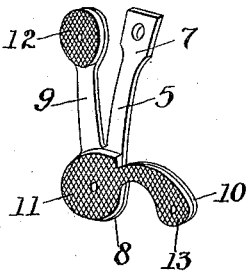
WITNESSES
A. D. Grover
Fred E. Dorr
INVENTOR
Louis E. Kirstein
by Alex. P. Browne,
attorney

United States Patent Office.

LOUIS E. KIRSTEIN, OF BOSTON, MASSACHUSETTS.

EYEGLASSES.

SPECIFICATION forming part of Letters Patent No. 627,196, dated June 20, 1899.

Application filed December 27, 1898. Serial No. 700,343. (No model.)

*To all whom it may concern:*

Be it known that I, LOUIS E. KIRSTEIN, a citizen of the United States, residing at Boston, in the county of Suffolk and State of Massachusetts, have invented certain new and useful Improvements in Eyeglasses, of which the following is a specification.

My invention relates to eyeglasses, and more particularly to the clips or nose-engaging pieces which maintain the glasses in position on the nose of the wearer.

The object of my invention is to provide a simple nose piece or clip which shall be efficient to hold the glasses firmly in place upon the nose and effectually prevent the tipping forward which has proved troublesome in the case of the eyeglasses hitherto used.

In the accompanying drawings, Figure 1 is a front view of a pair of eyeglasses provided with my invention. Fig. 2 is a section on the line 2 2 of Fig. 1. Fig. 3 is a section through the lens-strap and adjacent parts at the point where the lens is attached thereto. Fig. 4 is a perspective view of my improved nose-clip detached.

The lenses 2 2, lens-straps 3 3, and spring 4 of the eyeglasses may be of any desired construction, but are preferably so arranged that, as shown in the drawings, one of my nose-clips 5 and one end of the spring 4 may be attached to its respective strap 3 by means of a single screw 6 in accordance with a common construction.

My nose-clip 5 consists of an arm 7, adapted to be attached at its upper end to the rest of the eyeglass-frame, as above set forth, and extending downward therefrom a short distance, its lower end being provided with an enlargement 8, from which project two arms 9 and 10, the former extending upwardly at a slight angle to the arm 7 into position to engage the nose at a point behind the lenses and the arm 10 extending outwardly—that is to say, in front of the lenses—in a substantially horizontal direction into position to rest against the bridge of the nose. The parts 8, 9, and 10 are provided with suitable pads 11, 12, and 13 or similar friction devices.

The parts 7, 8, 9, and 10 are preferably made integral with one another by being struck from a piece of thin sheet metal, which should be sufficiently flexible to permit of the bending of said arms sufficiently to adjust and fit them to the nose of the wearer of the glasses.

By means of the pads 11 and 12 of my improved nose-clip the glasses are firmly secured to the nose, the arms 10 and pads 13 being efficient chiefly in preventing the glasses from tipping forward. I am aware that prior to my invention eyeglasses have been constructed having a nose-clip provided with a number of arms extending backward therefrom—that is to say, behind the plane of the lenses when the glasses are being worn; but I am not aware that a nose-clip has ever before been made having a central engaging portion provided with a single rearwardly-extending arm and a supplementary forwardly-extending arm, both adapted to engage the nose of the wearer in the manner above described.

I claim—

A nose-clip for eyeglasses, consisting of the arm 5, provided at its lower end with an enlargement 8 having arms 9 and 10 extending therefrom, and provided with pads, substantially as and for the purpose described.

In testimony whereof I have hereunto subscribed my name this 23d day of December, 1898.

LOUIS E. KIRSTEIN.

Witnesses:
  E. D. CHADWICK,
  ALEX. P. BROWNE.